United States Patent [19]
Kirstein

[11] Patent Number: 5,636,618
[45] Date of Patent: Jun. 10, 1997

[54] DEVICE FOR FEEDING FUEL AND COMBUSTION AIR TO INTERNAL COMBUSTION ENGINES

[75] Inventor: Gerhard Kirstein, Augsburg, Germany

[73] Assignee: Kirstein GmbH Technische Systeme, Germany

[21] Appl. No.: 399,729

[22] Filed: Mar. 7, 1995

[30] Foreign Application Priority Data

May 13, 1994 [DE] Germany ............... 44 16 870.5

[51] Int. Cl.⁶ ............................................. F02B 33/00
[52] U.S. Cl. ................................................. 123/564
[58] Field of Search ..................... 123/559.1, 559.3, 123/564; 60/602

[56] References Cited

U.S. PATENT DOCUMENTS

| | | | |
|---|---|---|---|
| 2,660,991 | 12/1953 | Wasielewski | 123/559.3 |
| 3,007,626 | 11/1961 | Simson | 123/564 |
| 3,020,901 | 2/1962 | Cook | 123/559.1 |
| 3,673,796 | 7/1972 | Weick et al. | 123/564 |
| 4,556,038 | 12/1985 | Okamoto et al. | 123/564 |
| 4,589,396 | 5/1986 | Tokushima et al. | 123/564 |
| 4,826,412 | 5/1989 | Kubo et al. | 123/564 |

FOREIGN PATENT DOCUMENTS

| | | |
|---|---|---|
| 0531277 | 3/1992 | European Pat. Off. . |
| 3306484 | 3/1983 | Germany . |
| 3929104 | 3/1990 | Germany . |
| 60-209626 | 10/1985 | Japan ............ 123/559.3 |
| 61-31621 | 2/1986 | Japan ............ 123/559.3 |
| 61-218731 | 9/1986 | Japan ............ 123/564 |

OTHER PUBLICATIONS

Patent Abstracts of Japan, No. JP2102332, Apr. 13, 1990.

Edmonts, Johannes: "Electronic control devices of the new BMW–Turbo–Engine" in MTZ Motortechnische Zeitschrift 44, 1983, 4, S.117–120.

*Primary Examiner*—Michael Koczo
*Attorney, Agent, or Firm*—Ostrolenk, Faber, Gerb & Soffen, LLP

[57] ABSTRACT

An ignition and mixture-forming apparatus and method for an internal combustion engine, wherein as a function of position, speed, or acceleration of an engine throttle displacement device measured by a sensor, and when the adjustment exceeds a preset value, a valve is opened to feed compressed air from a compressed-air accumulator to one or more cylinders of the engine, in addition to the intake air and the feed capacity of the fuel pump being increased, so that the filling of the cylinders with fuel/air mixture increases and the engine power thus increases. Another sensor prevents feeding of compressed air when engine speed has exceeded a preset upper limit.

26 Claims, 1 Drawing Sheet

DEVICE FOR FEEDING FUEL AND COMBUSTION AIR TO INTERNAL COMBUSTION ENGINES

BACKGROUND OF THE INVENTION

The present invention relates to a device for feeding fuel and combustion air to internal combustion engines wherein the amount of combustion air fed is increased to meet certain changes in engine speed of adjustment.

In modern motor vehicles, ignition and mixture-forming systems which have a common regulation and control of the individual ignition and mixture forming systems in the form of digital motor electronics, also known as digital motor management, are generally used. To form the mixture, either central injection is used, in which the fuel is injected at only one place and then distributed over the cylinders, or multi-point injection is used, in which a separate valve is provided for each cylinder. The ignition system includes an ignition-map-based control with dwell-angle map which can be supplemented by knock control. Distribution of the ignition voltage is effected in this case by a high voltage distributor or without a distributor.

The heart of such a combined ignition and mixture forming system is a control device which, by means of maps, processes the data supplied by sensors in such a manner that the control pulses are optimal for one or more injection valves and one or more ignition coils with reference to the operating condition of the motor at the time. In this connection, the injection time as well as the dwell angle and firing angle are calculated in the control device by means of a microcomputer. It comprises an internal clock, a data bus, a microprocessor (CPU), a read-only memory (ROM), and a random access memory (RAM). The computer is ordinarily connected via an analog-to-digital converter to the analog sensors and, via output stages, to actuators which, as setting members, receive the pulses from the control device.

In light motors with small piston displacement, it is customary, in order to increase the power, to attach an exhaust gas turbocharger or a Root's blower by a flange to the motor in order to improve the cylinder filling by pre-compression of the air drawn in. In such a case, a supercharger pressure valve must also be integrated in the control and regulating circuit. The frequently cited advantages of increase in power by using an exhaust gas turbocharger (low power/weight ratio, less tendency to knocking, etc.) have, on the other hand, the disadvantage of providing relatively slow response upon acceleration from low speeds of rotation (turbohole) and relatively low power efficiency of the engine at low speeds of rotation (low exhaust gas velocity). Therefore, a noticeable increase in power is possible generally only in the middle and upper speed ranges. Since higher speeds of rotation produce a more frequent change of gas in the cylinder, the consumption of turbo engines in actual practice is frequently just as great as, and generally even greater than, in the case of aspirating motors of larger displacement, having the same power. Furthermore, due to the dead time between the giving of gas, e.g. opening the throttle, and the response of the supercharger, on the one hand, as well as between the cutting off of the gas and the decelerating of the supercharger on the other hand, sensitive dosaging of the power is not possible. Due to this characteristic, the turbo engine always somewhat overshoots the desired point and relatively high consumption is present, due to the difficulty in metering the power, even when no peak power is demanded from the engine.

Due to the nevertheless undeniable advantages of turbo charging, it would therefore be advisable to charge the engine only when high power is desired. Furthermore, the reaction time of the charging system should be less than is customary up to now. However, from the standpoint of construction, connecting or disconnecting is possible in the case of conventional supercharger designs only at unreasonably high expense.

SUMMARY OF THE INVENTION

The object of the present invention, is to develop an adjustable ignition and mixture forming system of the above mentioned type by adding sensors and actuators and including them into the motor control so that connecting and disconnecting the engine supercharging with precompressed air is possible in simple manner.

This object is achieved in accordance with the invention by feeding compressed air as combustion air to the engine for temporarily increasing the power of the engine, when the speed of adjustment or the change in the speed of adjustment of the engine exceeds a predetermined value. The compressed air is preferably fed suddenly and rapidly, as from an accumulator. Furthermore, when the engine rotation speed exceeds a preset upper limit, then feeding of compressed air is prevented.

The invention reduces the fuel consumption by the engine, since supercharging only takes place when high power is desired and required. Furthermore, in accordance with the invention, supercharging takes place with only very slight dead times with respect to the fuel injection signal, since compressed air for the supercharging is available to the combustion engine extremely rapidly.

Other features and advantages of the present invention will become apparent from the following description of the invention which refers to the accompanying drawings.

BRIEF DESCRIPTION OF THE DRAWING

The invention will be explained below on basis of a preferred embodiment, with reference to the accompanying drawing, in which.

DESCRIPTION OF THE PREFERRED EMBODIMENT

Figure 1:
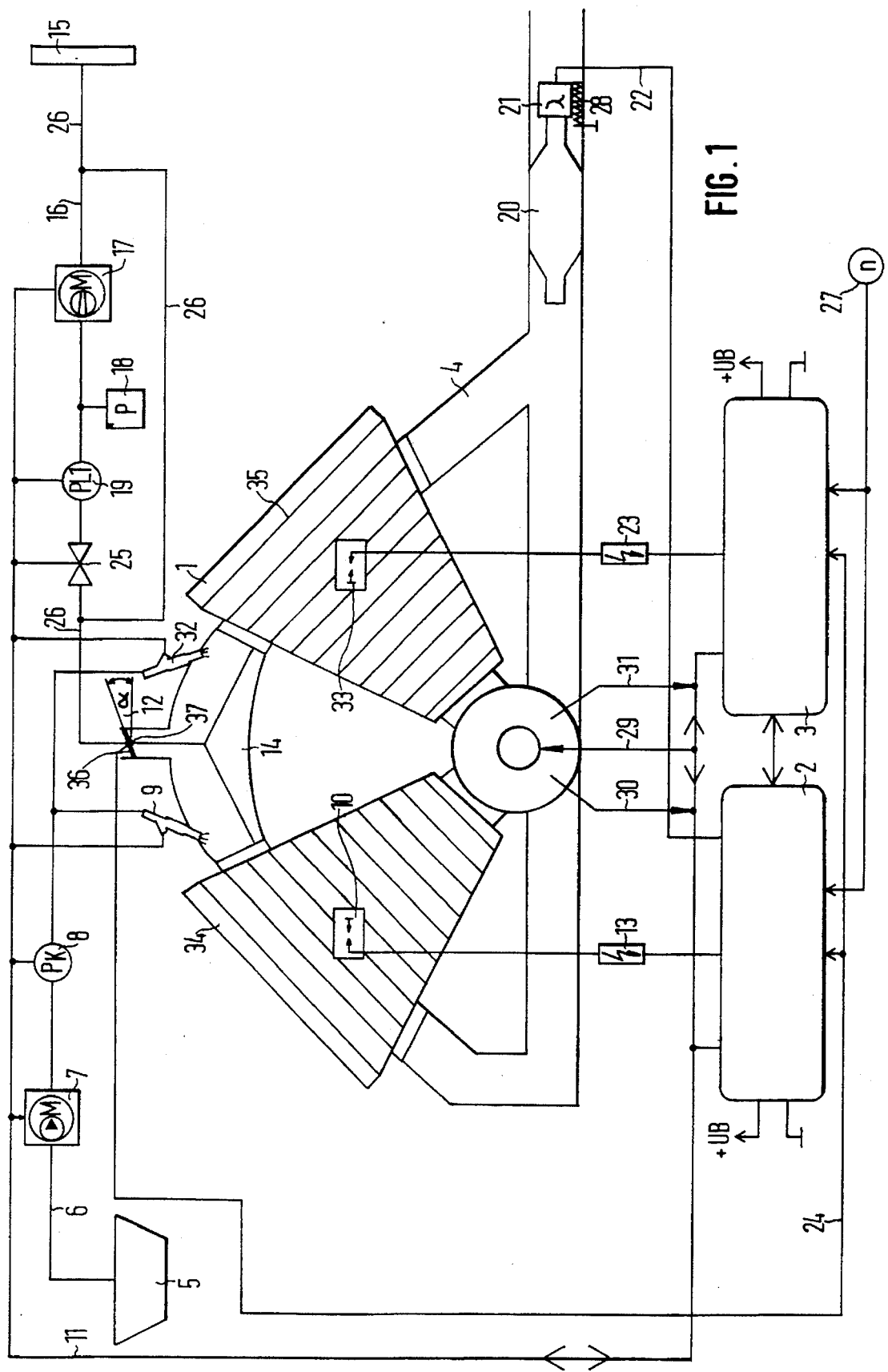
FIG. 1 is a block diagram of an ignition and mixture forming device according to the invention.

In the drawing, the following reference numerals are used for identifying corresponding elements of the ignition and mixture forming device of the invention:
1: Internal combustion engine
2: A control device which contains at least one processor or microcomputer for digital data processing
3: Another control device which contains at least one processor or microcomputer for digital data processing
4: An exhaust-gas line of the internal combustion engine 1
5: Fuel tank
6: Fuel line
7: Fuel feed pump
8: Sensor for the injection pressure of the fuel
9: Injection valve of an engine cylinder 34
10: Spark plug of the engine cylinder 34
11: A bundle of electric lines
12: Throttle-valve angle alpha
13: Ignition coil for the one engine cylinder 34
14: Intake connection
15: Air filter
16: Compressed-air inlet pipe
17: Air compressor
18: Compressed-air accumulator 19: Sensor for measuring the air pressure in the compressed-air line 16 downstream of the air compressor
20: Catalytic converter in the exhaust line 4
21: Heatable lambda probe
22: Bundle of electric lines for the heating and the lambda signal of the lambda probe 21
23: Ignition coil for another engine cylinder 35
24: Bundle of electric lines for electric signals which are produced as a function of positions of a throttle-setting device
25: Compressed-air inlet valve
26: Intake pipe which connects the air filter with the intake connection 14
27: Speed-of-rotation sensor for measuring the speed of rotation of the engine or the speed of the vehicle
28: Heating for the lambda probe
29: Sensor for locating the crankshaft position of internal combustion engine 1
30: Sensor for measuring the engine temperature
31: Sensor for measuring the oil pressure of the combustion engine
32: Injection valve for an engine cylinder 35
33: Spark plug for the engine cylinder 35
34: Engine cylinder
35: Further engine cylinder
36: Throttle valve
37: Sensor for measuring the position of the throttle valve In the embodiment shown in FIG. 1, the ignition and mixture forming device serves for controlling and regulating the internal combustion engine 1, which has two cylinders 34 and 35 in a V-arrangement. Obviously, the number of cylinders is a matter of choice. The two cylinders 34 and 35 draw in air from the outside via the air filter 15 and the adjoining intake pipe 26 into the intake connection 14.

The additional compressed air inlet pipe 16 contains, arranged one after the other in the direction of flow, the air compressor 17, the compressed air accumulator 18, the compressed air sensor 19, and the compressed air inlet valve 25. The additional compressed air inlet pipe 16 is connected, in parallel to the intake pipe 26, to the intake connection 14. The compressed air inlet pipe 16 branches off from the intake pipe 26 directly after the air filter 15 and returns to the pipe 26 shortly before the intake connection 14 so that two parallel air paths 16, 26 are present for a given distance. However, it is also possible to develop the compressed air inlet pipe 16 completely separate from the intake pipe 26 and provide it with an air filter 15 of its own, and to connect it directly to the intake connection 14.

Fuel is conveyed from the fuel tank 5 through the fuel lines 6 by means of the fuel feed pump 7 to the injection valves 9, 32 of the cylinders 34, 35. The injection pressure sensor 8 reports the instantaneous injection pressure via the lines 11 to the control devices 2, 3.

Depending on the use made of the engine 1, a higher engine power is desired as a function of a given position, angular position, speed of rotation or translation or acceleration of the throttle displacement device 36. The throttle displacement device 36 can be actuated directly or indirectly. Gas pedals, throttle twist grips, or throttle slides are directly actuatable. They transmit their movement via a gas cable or other means to the throttle displacement device, particularly a valve 36 of the engine and thus indirectly actuate the latter.

In the preferred embodiment of the invention, the throttle displacement device 36 is the throttle valve. The positioning angle of the valve 36 is detected by the throttle valve sensor 37, for instance a throttle valve potentiometer which is connected by the electric lines 24 to the control devices 2, 3.

The lines 11 connect the compressor 17, the air-pressure sensor 19, and the valve 25 to the control devices 2, 3. The two injection valves 9, 32, the injection-pressure sensor 8, and the fuel feed pump 7 are furthermore also electrically connected with the same lines 11, so that all of the sensors and actuators can be actuated by the control devices 2, 3. Furthermore, the lambda probe 21 of the catalytic converter 20 which is contained in the exhaust line 4 of the cylinders 34, 35 is electrically connected by the lines 22 to the control devices 2, 3.

Each of the control devices 2, 3 contains a microcomputer. The one control device 2 sends ignition pulses to the ignition coil 13 which, as a function thereof, produces an electric firing voltage for the spark plug 10 of the one cylinder 34, as shown in FIG. 1. The control device 2, together with the actuators, injection valve 9, spark plug 10 and ignition coil 13 and the sensor 31 for the oil pressure of the engine 1, the sensor 30 for the engine temperature, and the sensor 29 for the crankshaft positions, forms a separate control circuit for the one cylinder 34. The sensor data for the one cylinder 34 is converted into corresponding actuator data such as, for instance, firing time and injection time.

The other control device 3 in corresponding fashion is for regulating the control circuit for the other cylinder 35. As shown in FIG. 1, the ignition coil 23 and the spark plug 33 of this cylinder 35 are electrically connected with the other control device 3. In addition, this other control device 3 has a redundant function so that in case of a defect in or failure of the one control device 2, the device 2 can take over all ignition and mixture forming functions for the one cylinder 34. Conversely, the one control device 2 also has a redundant function for the other control device 3.

In other embodiments of the invention, more than two control devices 2, 3 can be provided, depending on the number of cylinders and the construction of the engine 1. One control device in each case independently regulates the ignition and mixture forming for one or more cylinders, and/or one control device assuming, in case of the failure of another control device, the functions of the latter.

In the following, the control and regulating functions of the ignition and mixture-forming device are described with respect to the supercharging of the engine 1.

The compressor 17, which is driven directly mechanically or indirectly electrically from the engine 1, draws air from the intake pipe 26 into the compressed-air inlet pipe 16 and fills the compressed-air accumulator 18 with air. The accumulator remains in communication with the compressed-air inlet pipe 16. The air-pressure sensor 19 measures the air pressure in the compressed-air accumulator 18 and produces a corresponding electric signal over the lines 11 to the control devices 2, 3. During the filling of the compressed-air accumulator 18, the control routines of the control devices 2, 3 keep the valve 25 closed so that no air can pass from the compressed-air inlet pipe 16 into the intake pipe 26. The compressor 17 remains connected as long as the pressure measured by the air-pressure sensor 19 is below an upper limit pressure $P_u$. When this limit pressure is reached, the air-pressure sensor 19 sends an electric signal over the lines 11 to the control devices 2, 3, which, over these same lines 11, sends control pulses to the compressor 17, which pulses disconnect the compressor.

Upon special use of the internal combustion engine and the ignition and mixture forming device in a motorcycle, additional supercharging of the internal combustion engine is desirable, in particular when the motorcycle is to be accelerated beyond the customary extent. The driver of the motorcycle then exerts a corresponding accelerated twisting motion on the twist grip throttle control. This is transmitted by a gas cable to the throttle valve 36 of the motor. The throttle-valve potentiometer 37 detects the angular position of the throttle valve 36 and sends a corresponding electric voltage signal over the lines 24 to the control devices 2, 3. From the change in the voltage signal with respect to the internal clock of the microcomputers of the control devices 2, 3, the microcomputers calculate the instantaneous angular acceleration $d^2\alpha/dt^2$ of the throttle valve 36. The microcomputers of the control devices 2, 3 compare this value with a stored angular acceleration limit value $d^2\alpha/dt^2$limit. In the event that this limit value is exceeded, microcomputers send an opening signal to the valve 25, which thereupon opens. Compressed air now suddenly flows out of the compressed-air accumulator 18 of the compressed-air inlet pipe 16 into the intake connection 14 of the cylinders 34, 35. A flap valve (not shown) in intake pipe 26 prevents the compressed air from flowing back through the intake pipe 26 and cut to the atmosphere. The instantaneous pressure in the compressed-air accumulator 18 is continuously detected by the air pressure sensor 19 which sends a corresponding electrical signal to the control devices 2, 3. When additional compressed air is thus blown into the cylinders 34, 35 so that there is an increase in power by increase of the motor filling, more fuel is also injected into the intake connection 14. This takes place in the manner that the electrical signal of the air-pressure sensor and the electrical injection pressure signal which the injection pressure sensor 18 reports to the control devices 2, 3 are placed in relationship to each other and are compared with a guide value stored in the control devices 2, 3. In case excess air is blown in by the additional compressed air, the fuel feed pump 7 receives a signal to increase the injection pressure and thereby, accordingly, to feed more fuel.

After the compressed-air accumulator 18 has become at least partially empty and the pressure measured by the compressed-air sensor 19 has dropped below the upper limit pressure $P_u$ or a bottom limit pressure $P_b$, the valve 25 receives a closing signal from the control devices 2, 3, and the compressor 17 is activated in order again to fill the compressed-air accumulator 18.

In accordance with another embodiment, the compressed-air accumulator 18 could be filled with compressed air from a separate source of compressed air instead of being filled by the compressor 17 which is driven by the engine. Although, in the preferred embodiment, operation of the compressor 17 is only contemplated when the valve 25 is closed, in another embodiment the compressor 17 could operate also with the valve 25 open.

The catalytic converter 20 in the exhaust line 4 of the cylinders 34, 35, contains the heating device 28. The lambda probe 21 of the catalytic converter 20 measures the amount of oxygen in the exhaust gas and sends a corresponding electrical measurement signal over the electric lines 22 to the control devices 2, 3 which changes the duration and quantity of the injection so that the air ratio lambda is set approximately to a value of 1. In the preferred embodiment of the invention, the lambda control can be connected or disconnected as a function of the open or closed condition of the valve 25 so that characteristic curves differing from the ideal value of 1 can also be used in the control devices 2, 3.

In another embodiment in which a catalytic converter 20 is arranged in the exhaust line 4 of the internal combustion engine 1, wherein the operation of the converter is regulated as a function of an operating value of the device, such as, in particular, its filling content of exhaust-gas particles and/or the respective condition of the fuel/air mixture of the internal combustion engine 1, electronic control means 2, 3 are provided which, as a function of the feeding of additional combustion air 16 to the internal combustion engine 1, disconnect the regulation of the catalytic converter 20 when the feed of the additional combustion air 16 is connected.

Even if the internal combustion engine 1 does not have a catalytic converter 20 or a lambda control, a control can be provided which regulates the feed of air and fuel as a function of the condition of the engine exhaust gases in the engine exhaust-gas pipe 4. This control can be influenced or possibly connected or disconnected when the feed of the additional combustion air is connected.

Furthermore, within the scope of the invention, it is provided that, as from a given speed of travel of the vehicle or speed of rotation of the engine, which is measured by the speed of rotation sensor 27, for instance on the crankshaft, and sent to the control devices 2, 3, no additional injection of compressed air into the cylinders 34, 35 can take place for reasons of safety.

In the event of the failure or defective nature of an element, for instance one of the sensors or one of the setting members, an emergency program is commenced by a microcomputer of the control devices; 2 and 3, so that stored substitute values are used instead of the missing or false data.

In accordance with one particular embodiment, the compressed-air inlet valve 25 is arranged at the throttle valve 36 and is controlled as a function of it.

Although the present invention has been described in relation to particular embodiments thereof, many other variations and modification and other uses will become apparent to those skilled in the art. It is preferred, therefore, that the present invention be limited not by the specific disclosure herein, but only by the appended claims.

What is claimed is:

1. An apparatus for feeding fuel and compression air to an internal combustion engine comprising:
   first means for adjustable feeding of fuel and air to the engine;
   second means for feeding compressed air as additional combustion air to the engine in addition to the air fed by the first means for temporarily increasing the power of the engine, the second feed means being operable for feeding the compressed air when at least one of the speed of adjustment and the change thereof in the direction toward a larger feed of at least one of fuel and air exceeds a predetermined value;
   a speed of rotation sensor for the engine rotation; and
   third means for blocking the start of feeding additional combustion air when the speed of rotation sensor senses that the engine rotation speed exceeds an upper limit value.

2. The apparatus of claim 1, wherein the second feed means comprises:
   a compressed air accumulator for storing compressed air;
   a compressed air inlet valve between the accumulator and the engine, the inlet valve being operable to permit compressed air to move to the engine when at least one of the speed of adjustment and the change thereof exceeds the predetermined value.

3. The apparatus of claim 2, further comprising a compressor for filling the accumulator with compressed air.

4. The apparatus of claim 3, wherein the compressor is connected with the engine for being driven by the operation of the engine to provide compression.

5. The apparatus of claim 3, further comprising an air pressure sensor connected for measuring the pressure of the compressed air in the accumulator, the sensor being adapted for operating the compressor as a function of the air pressure measured by the sensor, whenever the air pressure in the accumulator falls below a predetermined minimum value.

6. The apparatus of claim 5, further comprising a sensor for measuring at least one of the speed of adjustment and the change of the speed of adjustment of the engine and for producing an electrical signal for controlling the second means for feeding compressed air.

7. The apparatus of claim 6, wherein the speed of adjustment sensor comprises an engine throttle displacement device for displacing the throttle and comprises a sensor for sensing at least one of the position, speed and acceleration of the throttle displacement device.

8. The apparatus of claim 1, wherein the third means comprises electric control means which are connected with the rotation speed sensor to receive a speed signal therefrom and to in turn prevent operation of the second feed means.

9. The apparatus of claim 1, wherein the rotation speed sensor measures engine speed directly on a part of the engine.

10. The apparatus of claim 1, wherein the rotation speed sensor measures engine speed indirectly on a part driven by the engine.

11. The apparatus of claim 1, where the engine includes an exhaust gas line and a catalytic converter in the line which is operated under the control of an operating value of the apparatus;

control means connected with the second feed means and with the catalytic converter for disconnecting the catalytic converter operation when the second means is operable to feed additional combustion air.

12. The apparatus of claim 11, wherein the catalytic converter is controlled by an operating value of either the filling content of exhaust gas particles of the engine or the instantaneous condition of the fuel air mixture of the engine.

13. The apparatus of claim 1, further comprising at least one electronic device for controlling the first and the second feed means and also for controlling ignition of the fuel air mixture in the engine.

14. The apparatus of claim 13, wherein there are two of the electronic devices, each including a respective processor for digital data processing and both being redundantly connected to the first and second feed means and for ignition of the fuel air mixture, the processors dividing the control and regulating functions to the cylinders of the engine at each electronic device, and each processor including means enabling the processor to assume the function of the other electronic device, if the other electronic device fails to function.

15. The apparatus of claim 14, further comprising a computer which is preprogrammed to cause the first and second feed means and the ignition device to operate correctly with a preset value for operating the engine in the event of failure of one of the electronic devices.

16. The apparatus of claim 1, further comprising an ignition device and a computer which is preprogrammed to cause the first and second feed means and the ignition device to operate correctly with a preset value for operating the engine in the event of a device failure.

17. An apparatus for feeding fuel and compression air to an internal combustion engine comprising:

an actuator for controlling the speed and the acceleration of the engine;

a source of fuel for delivering an adjustable amount of fuel to the engine in response to the actuator;

a source of air for delivering combustion air to the engine in response to the actuator;

a source of compressed air for delivering an adjustable amount of compressed combustion air to the engine;

a controller for regulating the amount of compressed air delivered from the source of compressed air to the engine, the controller being operable to permit delivery of the compressed air when at least one of the speed and acceleration of the engine exceeds a predetermined value;

a speed of rotation sensor for sensing the rotational speed of the engine; and a threshold element for inhibiting the delivery of combustion air to the engine according to the rotational speed of the engine sensed by the speed of rotation sensor.

18. The apparatus of claim 17, wherein the source of compressed air comprises:

a compressed air accumulator for storing compressed air;

a compressed air inlet valve between the accumulator and the engine, the inlet valve being operable to permit delivery of compressed air to the engine when at least one of the position, velocity of translation and acceleration of the actuator exceeds a predetermined value.

19. The apparatus of claim 18, further comprising an air pressure sensor for measuring the pressure of the compressed air in the accumulator, the sensor being adapted for permitting the storing of compressed air in the accumulator in response to air pressure measured by the sensor when the air pressure in the accumulator falls below a predetermined minimum value.

20. The apparatus of claim 18, further comprising a compressor for filling the accumulator with compressed air.

21. The apparatus of claim 20, wherein the compressor is connected with the engine for being driven by the operation of the engine to provide compression.

22. The apparatus of claim 17, wherein the threshold element comprises electronic controller which is connected to the rotation speed sensor to receive a speed signal therefrom and to in turn prevent the delivery of combustion air to the engine.

23. The apparatus of claim 17, wherein the rotation speed sensor measures engine speed directly on a part of the engine.

24. The apparatus of claim 17, wherein the rotation speed sensor measures engine speed indirectly on a part driven by the engine.

25. The apparatus of claim 17, further comprising an engine sensing element for sensing at least one of the speed and acceleration of the engine, the engine sensing element producing an electrical signal for input to the controller for regulating the amount of compressed air delivered from the controllable source of compressed air to the engine.

26. The apparatus of claim 25, wherein the engine sensing element is an actuator sensing element for sensing at least one of a position, velocity of translation and acceleration of the actuator, the position, velocity of translation and acceleration of the actuator corresponding to the speed and acceleration of the engine.

* * * * *